(12) United States Patent
Hamada (10) Patent No.: US 9,094,646 B2
(45) Date of Patent: Jul. 28, 2015

(54) PRINTER FOR CREATING A PRINT PROFILE

(75) Inventor: Tetsuya Hamada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1238 days.

(21) Appl. No.: 12/621,395

(22) Filed: Nov. 18, 2009

(65) Prior Publication Data

US 2010/0157332 A1    Jun. 24, 2010

(30) Foreign Application Priority Data

Dec. 22, 2008 (JP) ................................. 2008-326586

(51) Int. Cl.
  *G06F 15/00* (2006.01)
  *H04N 1/60* (2006.01)
(52) U.S. Cl.
  CPC ..................................... *H04N 1/603* (2013.01)

(58) Field of Classification Search
  None
  See application file for complete search history.

(56) References Cited

U.S. PATENT DOCUMENTS

| 6,421,135 B1 * | 7/2002 | Fresk et al. ................... 358/1.15 |
| 6,762,852 B1 * | 7/2004 | Fischer ......................... 358/1.15 |
| 2002/0060703 A1 * | 5/2002 | Tsukada ........................... 347/5 |
| 2007/0146829 A9 * | 6/2007 | Coons et al. ................... 358/504 |

FOREIGN PATENT DOCUMENTS

JP        11-349150 A        12/1999

* cited by examiner

*Primary Examiner* — Jeremiah Bryar
(74) *Attorney, Agent, or Firm* — Fitzpatrick, Cella, Harper & Scinto (57) ABSTRACT

A printer of the present invention prohibits print-media replacement or operations of the printer, when executing a profile creation mode of creating profile data that is used for color conversion processing performed on image data that is to be printed by a print unit.

18 Claims, 8 Drawing Sheets

PRINTER FOR CREATING A PRINT PROFILE

BACKGROUND OF THE INVENTION

1. Field of the Invention

The present invention relates to a printer and a print control method and more particularly relates to a method for controlling a printer at the time of creating a print profile.

2. Description of the Related Art

With the development of color output devices typified by printers and the like, it has become possible to print and output data from printers on various kinds of media (e.g., a sheet of paper or film). Recently, the number of media that are printable with printers is increasing, and in response to the demands of the market, many media manufacturers have begun to introduce a wide variety of media onto the market. Under such circumstances, printer drivers that can support a considerably wide variety of media from the beginning of installation are becoming popular; users are capable of freely replacing media with what they want to use and printing data thereon. When a user replaces a medium, the printer is controlled by a printer control parameter that is suitable for a replacement medium.

For media replacement, together with the operation of replacing a medium, a user also needs to provide a printer control parameter suitable for a replacement medium. If the printer control parameter provided is not suitable for the medium, the printer may not work properly. Thus, a method is known in which a user who replaced a medium must without fail change settings so that the printer control parameter is suitable for a replacement medium (see Japanese Patent Laid-Open No. 11-349150).

SUMMARY OF THE INVENTION

Since the number of media that are printable with printers is increasing and printer drivers that can support a considerably wide variety of media from the beginning of installation are becoming popular, users have become capable of freely replacing media with what they want to use and printing data thereon. However, there are still many new released media and many media that were not originally supported by any printer drivers in the world, in spite of the fact that using such media for printing is desired by many users.

In order to respond to such needs, creation systems have been devised, by which users are capable of creating color profiles that are to be added to printer drivers. Such creation systems enable users to add new media profiles (color profiles) created by special-purpose profile creation software to their driver software. A method that is popularly known for such later creation of additional media profiles is as follows: a user loads an arbitrary medium for which a profile is to be created, on a printer; then, patch image data that is necessary to create a profile is transferred from an external computer (hereinafter referred to as a PC) via special-purpose profile creation software to the printer, where the data is printed; and after a predetermined period of drying and subsequent color measurement, a profile is created using the obtained color measurement data.

In recent network environments, however, if a printer is connected to a network system, a user who is creating a media profile cannot always monitor the printer or have sole possession of the printer. Examples of such situations include the case where a printer is located some distance from a user; or the case where a user needs to leave a printer for a color measurement operation or any other operations. In such cases, the problem is that other users may replace the print medium without noticing that media-profile creation is being executed, because of the fact, as described above, that users are capable of selecting a wide variety of print media as well as freely replacing them at any time.

According to one aspect of the present invention, there is provided a printer including a print unit comprising: an execution unit that executes a profile creation mode of creating profile data that is used for color conversion processing performed on image data that is to be printed by the print unit; and a prohibition unit that prohibits print-media replacement or an operation of the printer, in response to execution of the profile creation mode.

According to the present invention, when a printer has been set to the profile creation mode, print-media replacement is prohibited during the course of profile creation. This brings about the effect of preventing such profile creation from ending in failure.

Further features of the present invention will become apparent from the following description of exemplary embodiments (with reference to the attached drawings).

DESCRIPTION OF THE EMBODIMENTS

First Embodiment

Figure 1:
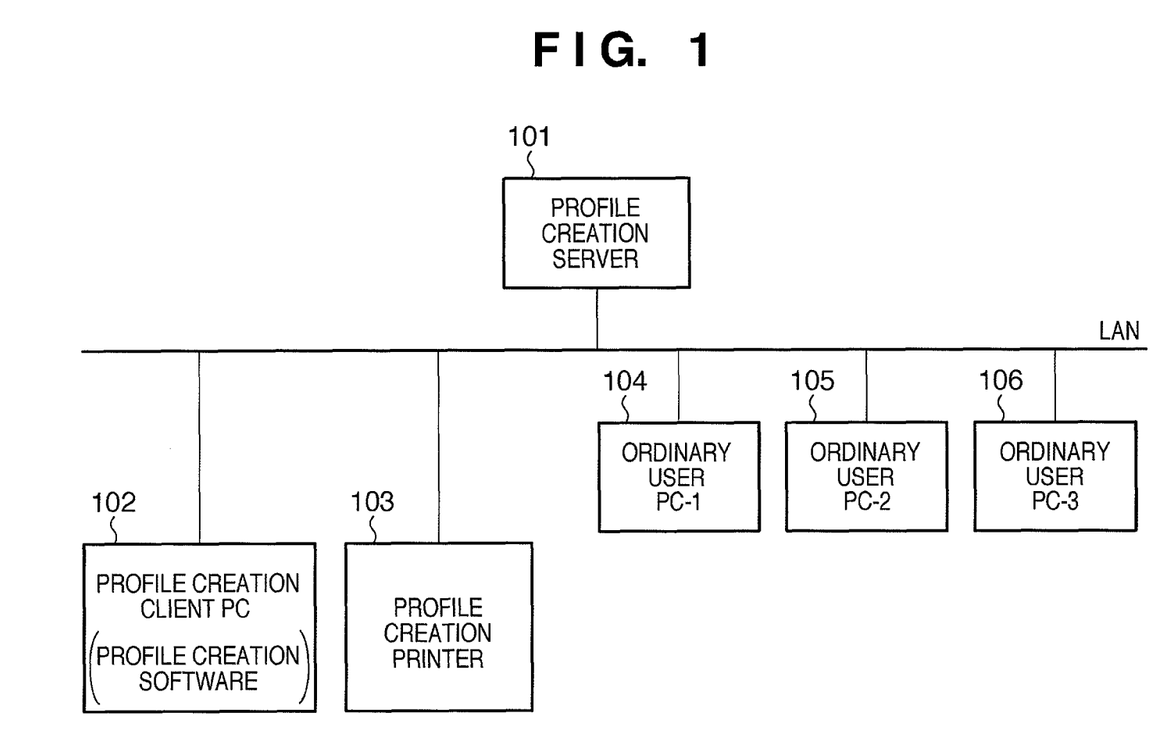
FIG. 1 is an exemplary system block diagram of a printer and an information processor according to a first embodiment.

Now, a first embodiment according to the present invention will be described in detail with reference to the drawings. FIG. 1 is a system block diagram of a printer and an information processor, explaining the first embodiment of the present invention. The system of the present exemplary embodiment enables the execution of a profile creation mode of creating profile data that is used for color conversion processing for converting the color of image data (color data) that is to be printed by the printer, in order to adjust the color tone of the image displayed on the information processor and the color tone of the image output from the printer. Referring to FIG. 1, a profile creation server 101 creates a profile. A profile creation client PC 102 operates a profile creation tool. A profile creation printer 103 is a target printer in which a profile is to be created (herein referred to simply as a "printer"). PCs 104, 105, and 106 are general user PCs. The above-described devices are connected to a network through a LAN so that they are capable of performing data communications.

Figure 2:
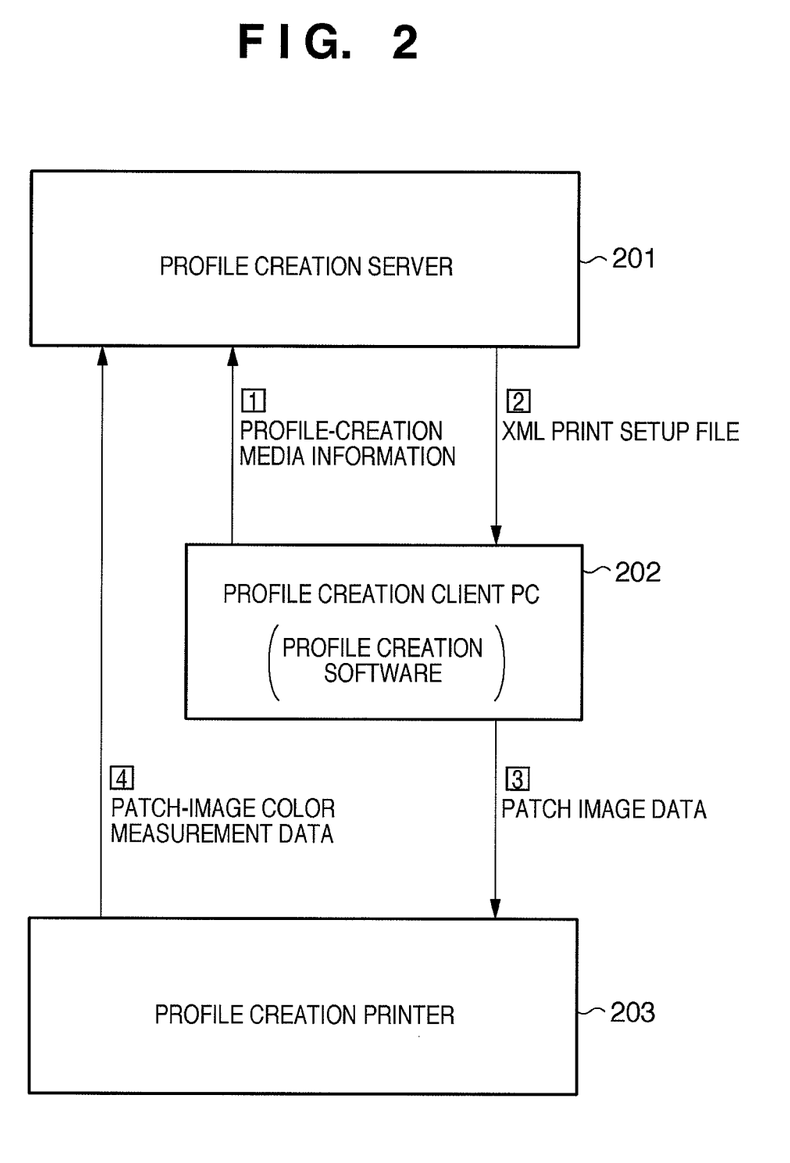
FIG. 2 is an exemplary data flow diagram for profile creation according to the first embodiment.

FIG. 2 is a data flow diagram illustrating data exchange in a server-client system at the time of creating a profile, explaining the first embodiment of the present invention.

Referring to FIG. 2, a profile creation server 201 is equivalent to the profile creation server 101 described in FIG. 1. A profile creation client PC 202 is equivalent to the profile creation client PC 102 described in FIG. 1. A profile creation printer 203 is equivalent to the profile-creation target printer 103 described in FIG. 1. An XML print setup file is transmitted from the profile creation server 201 to the profile creation client PC 202, whereas profile-creation media information is transmitted from the profile creation client PC 202 to the profile creation server 201. Meanwhile, patch image data that is generated based on the XML print setup file received from the profile creation server 201 is transferred from the profile creation client PC 202 to the profile creation printer 203.

Figure 3:
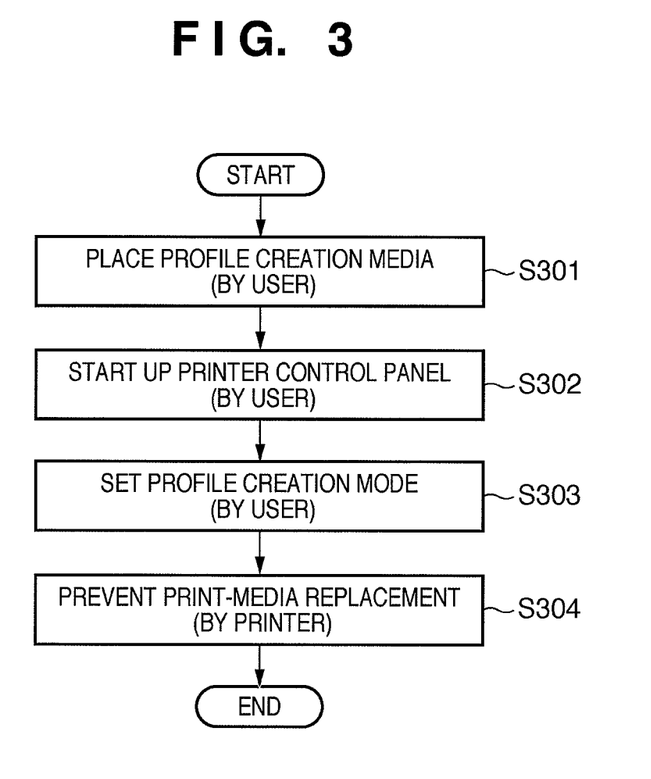
FIG. 3 is a flow chart illustrating a procedure for setting up a profile creation mode.

FIG. 3 is a flow chart illustrating a procedure for setting up the profile creation mode, explaining the first embodiment of the present invention. In S301 through S303, a user gives instructions to the printer; the printer serves as a receiving unit that provides a user with a user interface and receives operating instructions for setting up the mode. First, a user places a medium for which a media profile is to be created, on the printer in S301 (print-media placement step). Then, in S302, the user starts up a printer control panel so that operational instructions can be given to the printer (control-panel startup step). In S303, the user sets the printer to the profile creation mode via the started printer control panel (profile-creation-mode setup step). In S304, the printer performs an operation to prevent the placed print medium from being replaced (print-media-replacement prevention step).

Figure 8:
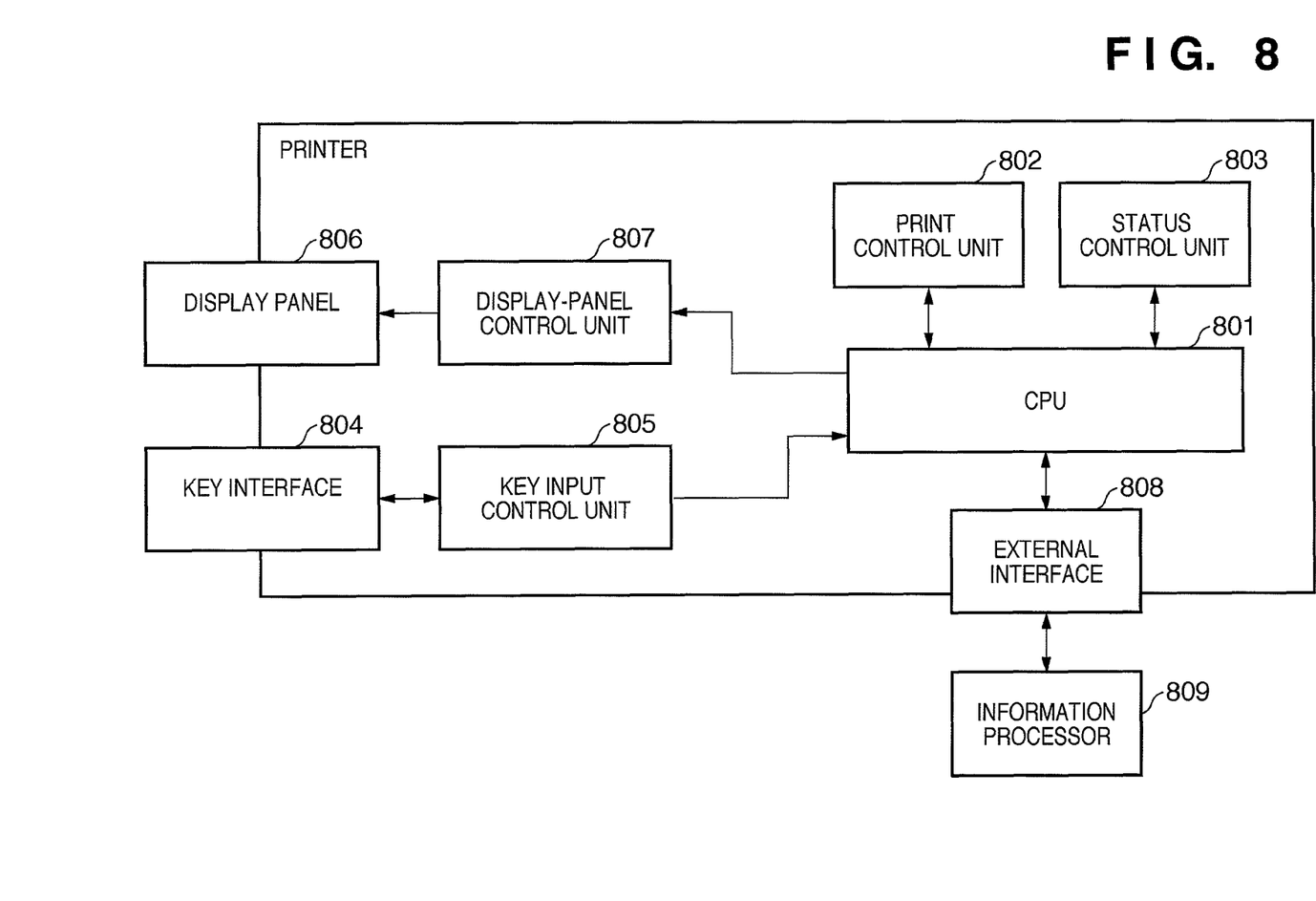
FIG. 8 is an exemplary entire block diagram of a printer and an information processor according to the first embodiment.

FIG. 8 is an entire block diagram of such a printer and an information processor, explaining the first embodiment of the present invention. Referring to FIG. 8, a CPU 801 exercises centralized control of the printer. A print control unit 802 controls printing by the printer. A status control unit 803 controls the status of the printer. A key interface 804 is an interface for enabling a user to make a key input. A key input control unit 805 controls information that has been input via the key interface 804. A display panel 806 displays information for the user. A display-panel control unit 807 controls the display panel 806. An external interface 808 performs communications with external devices. An information processor 809 transmits print data to the printer or receives information from the printer.

Next, the first embodiment of the present invention will be described. A printer and an information processor according to the present invention and their operations will be described below with reference to FIG. 1. The profile creation server 101 has the function of exercising job management for the entire profile-creation operation and actually generating a media profile from color measurement data by computation. A user creates a profile using profile creation software installed on the profile creation client PC 102. The profile creation software has the function of performing data communications with the profile creation server 101 and transmitting print data to the profile creation printer 103. If profile creation is not being performed, ordinary users are capable of using ordinary user PCs to cause the profile creation printer 103 to perform printing through a network. At that time, users may freely replace media placed on the profile creation printer 103 according to the uses to which printing is applied.

The operations of the printer will be described with reference to FIG. 8. A user creates printer settings via the key interface 804. The input contents from the user are transmitted to the CPU 801 via the key input control unit 805. The CPU 801 controls the print control unit 802 and the status control unit 803 according to the contents set by the user. The print control unit 802 controls printing of image data. The status control unit 803 controls the operating status of the printer. One function of the status control unit 803 is to control paper replacement operations by users. The status control unit 803 may also have the function of exercising control in prohibiting user operations via the control panel (operation unit) or may have the function of cancelling normal print data or executing normal print data after the creation of a profile. Meanwhile, the image data transmitted from the information processor 809 is transmitted to the printer via the external interface 808 and printed by the printer via the print control unit 802. The display panel 806 is a device that displays information to a user and is controlled by the display-panel control unit 807.

The flow of data for profile creation will be described in further detail with reference to FIG. 2. The profile creation client PC 202 has installed therein profile creation software. The profile creation software is designed to transmit media information about a print medium for which a user attempts to create a profile, to the profile creation server 201. The profile creation server 201 manages profile creation steps using job IDs that are uniquely defined for the management of profile creation jobs.

When information about a print medium, for which a profile is to be created, has been received from the profile creation client PC 202, job IDs that uniquely define profile creation jobs are created so that later profile creation steps are managed using the job IDs. Print patch data and information about the print mode of the printer that are necessary for each step are transmitted to the profile creation client PC 202 in the form of a print setup file described in XML format. In the profile creation client PC 202, the profile creation software creates appropriate patch image data based on the XML print setup file received from the profile creation server 201.

The created patch image data is transferred to and printed by the profile creation printer 203. After a set period of time during which ink is dried and solidified, the printed patch image data is subjected to color measurement by a color measuring device. Color measurement data obtained from the color-measured patch image is transmitted to the profile creation server 201 via the profile creation software in the profile creation client PC 202. The profile creation server 201 manages such received color measurement data with job IDs and uses the data to create a media profile. Following the operation steps through some repetitions of the above-described operations eventually completes the creation of a media profile for a new medium.

Next, the procedure of processing will be described in further detail with reference to FIG. 3. When creating a new media profile, a user places a print medium, for which a profile is to be created, on the profile creation printer 203 in S301. After the print medium has been placed on the profile creation printer 203, it is necessary to prevent the placed print medium from being heedlessly replaced.

Conventional printers generally offer free print-media replacement. However, if a print medium is replaced during the course of creating a print-media profile, proper color measurement data may not be obtained and the creation of the media profile may end in failure. In addition, if the creation of a media profile failed, it is difficult to determine at what point in time the profile creation has failed, so that the media-profile creation operation must be restarted from the very beginning. It is thus desirable for a user who is creating a media profile to prevent other users from heedlessly replacing the print medium placed on the profile creation printer 203.

A user who is creating a profile starts up a printer control panel in S302. The printer control panel serves as a control interface panel that controls printer operations: it receives instructions as to printer operations and enables printer control and a variety of settings. The user sets the printer to the profile creation mode via the printer control panel in S303. In S304, the printer that has been set to the profile creation mode operates so as to prevent heedless print-media replacement in the printer.

One concrete example of such a method for prohibiting print-media replacement is as follows: first, it is determined whether or not a printer is in profile creation mode; and if the printer is in profile creation mode and if other users who attempt to replace a print medium operate the printer control panel, a notification that the printer is in profile creation mode is given to the other users in order to prohibit heedless print-media replacement. Other examples that could be considered include a method in which a printer does not accept a print-media replacement operation via the control panel; and a method in which, if a printer has been set to the profile creation mode, a storage unit in which a print medium has been placed is mechanically locked. It is also possible to use all the above-described methods. The first embodiment of the present invention may use any method(s) as long as it is possible to prohibit other users from heedlessly replacing a print medium; the units and methods used therein are not intended to be limited. In either method, the status control unit 803 serves as a prohibition unit that exercises control in prohibiting print-media replacement or in prohibiting user operations via the control panel (operation unit). Note that, to release the printer from the profile creation mode, the printer control panel is started up in the same way as in setting up the profile creation mode so that the printer can be released from the profile creation mode via the printer control panel.

As described above, in the first embodiment of the present invention, a user who creates a profile is able to set a printer to the profile creation mode via the printer control panel after placing on the printer a print medium for which the profile is created. This prevents easy print-media replacement, thus preventing the use of an unintended print medium in the media-profile creation operation.

Second Embodiment

Figure 4:
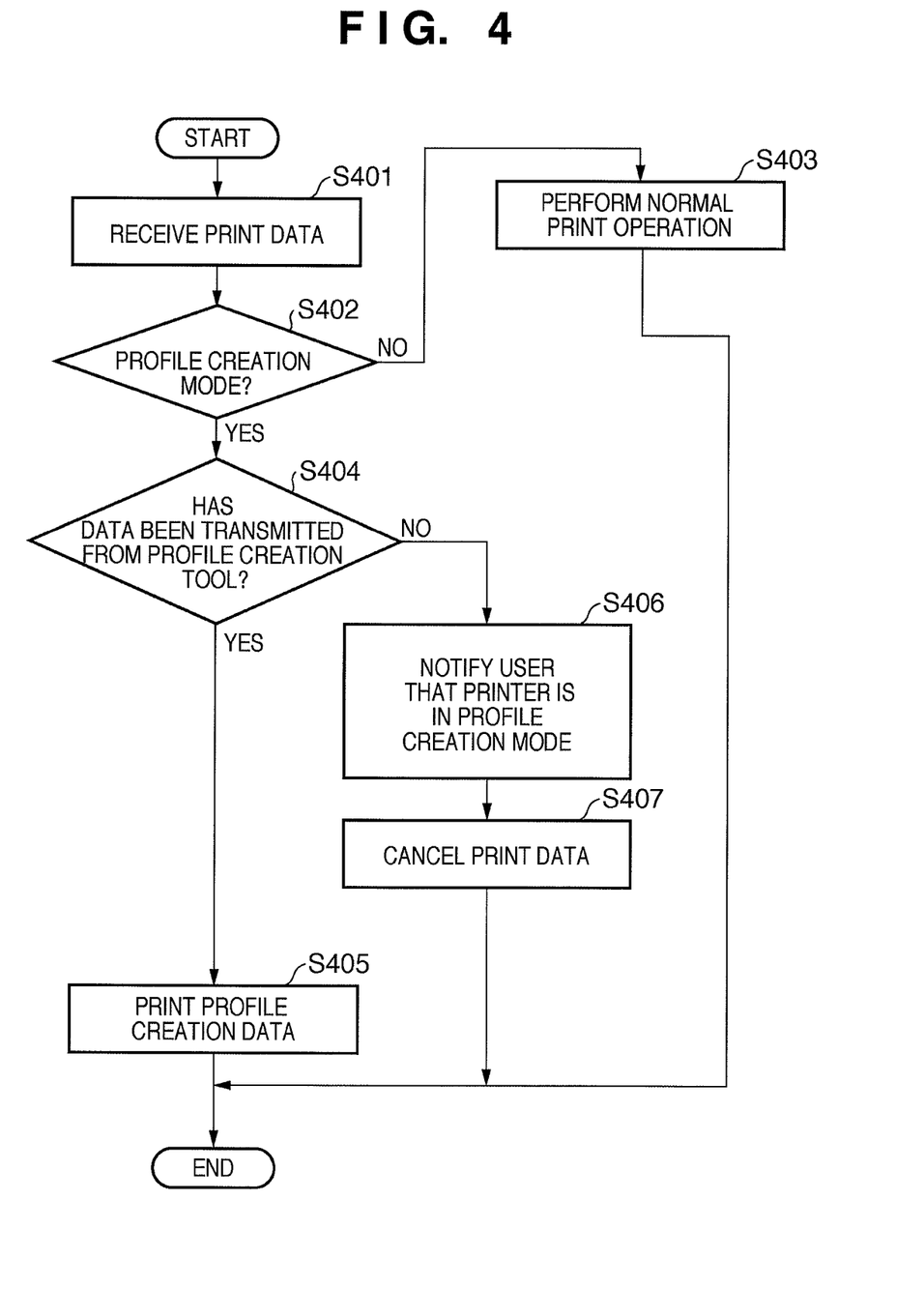
FIG. 4 is a flow chart illustrating print processing according to a second embodiment.

Now, another exemplary embodiment according to the present invention will be described in detail with reference to the drawings. FIG. 4 is a flow chart explaining a second embodiment of the present invention, illustrating print processing performed in the case where a printer has been set to the profile creation mode. The procedure illustrated in FIG. 4 is performed by the printer 103. Referring to FIG. 4, print data is received in S401 (print-data receiving step). In S402, it is determined whether or not the printer has been set to the profile creation mode (profile-creation-mode determination step). If the printer is not in profile creation mode, a normal print operation is implemented in S403 (normal-print implementation step). In S404, it is determined whether or not the print data has been transmitted from profile creation software (print-data identification step). If the received print data has been transmitted from the profile creation software, the print data is printed in S405 (profile-creation-data printing step). If the received print data has not been transmitted from the profile creation software, the user who transmitted that data (e.g., PC) is notified in S406 that the printer is in profile creation mode (profile-creation-mode notification step). In S407, the received print data is cancelled (print-data cancelling step).

Figure 5:
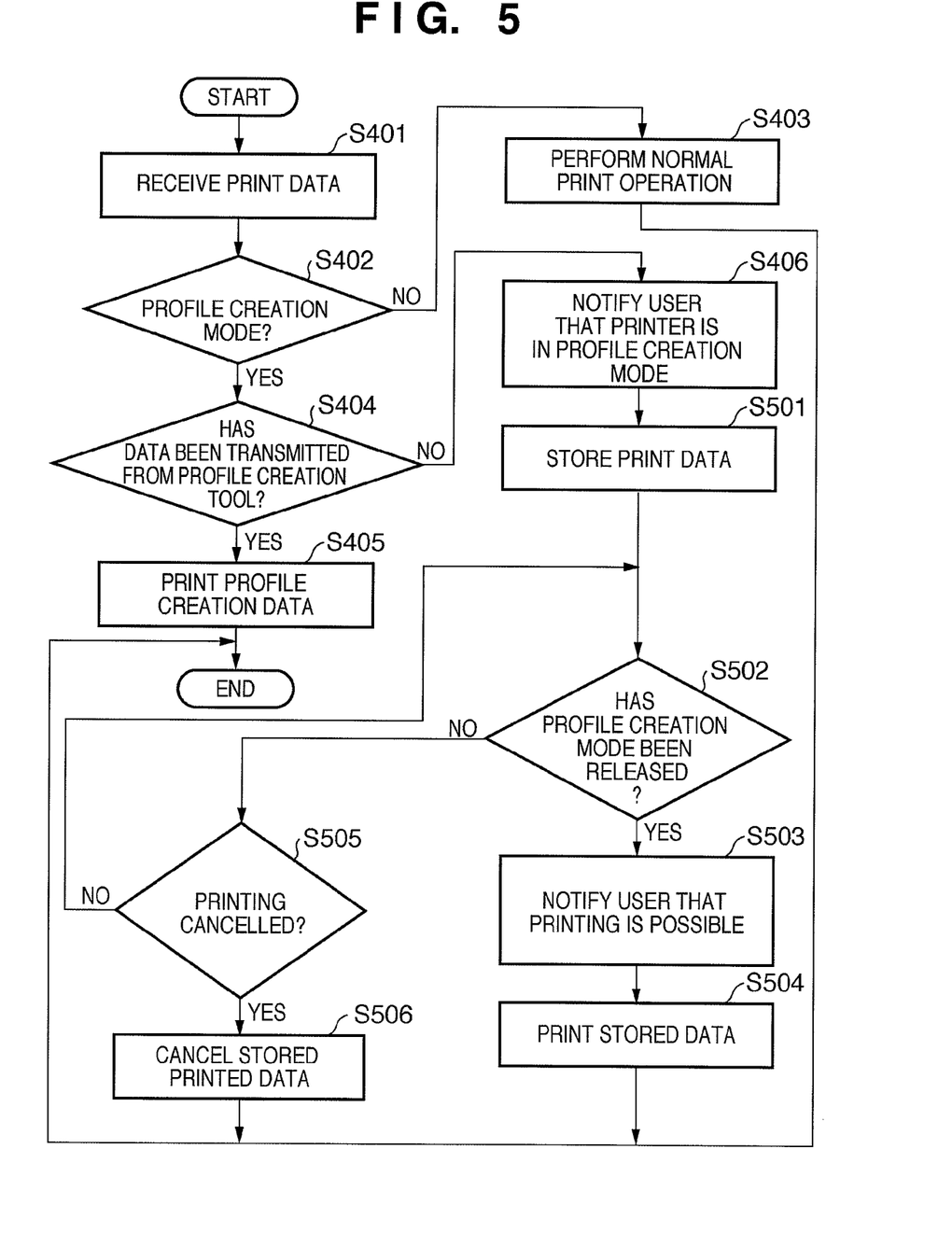
FIG. 5 is a flow chart illustrating print processing by a printer that includes a units for storing print data according to the second embodiment.

FIG. 5 is another flow chart explaining the second embodiment of the present invention, illustrating print processing performed in the case where a printer that includes units for storing print data has been set to the profile creation mode. The description of the same portions as described in FIG. 4 will be omitted herein.

Referring to FIG. 5, the received print data is stored in the memory unit of the printer in S501 (print-data storage step). In S502, it is determined whether or not the printer has been released from the profile creation mode (profile-creation-mode-release determination step). If the printer has been released from the profile creation mode, the user is notified in S503 that printing is possible (printable notification step). In S504, print processing is performed on the print data stored in the memory unit of the printer (stored-data printing step). If the printer has not been released from the profile creation mode, it is determined in S505 whether or not the user has cancelled print processing for the print data (print-data-cancellation determination step). If the user has cancelled the print data, the print data stored in the memory unit of the printer is cancelled in S506 (print-data cancelling step).

Next, the second embodiment of the present invention will be described, taking processing as a concrete example. The printer and the print control system according to the second embodiment of the present invention and their operations will be described below with reference to FIGS. 4 and 5. The second embodiment illustrates the operation of the profile creation printer described in the first embodiment at the time of receiving print data. A printer that is in the course of media-profile creation generally has a medium that currently has no media profile placed thereon; therefore, if a normal print operation is performed, the output is not always in an ideal color. Performing printing with the printer in such a status has a high risk of wasting time, resources, and media. In addition, sudden execution of printing that is irrelevant to profile creation is also undesirable for a user who is creating a profile.

Hence, in the second embodiment of the present invention, if the profile creation printer 203 has received print data in S401, it is determined in S402 whether or not a normal print operation is possible, that is, whether or not the printer is in profile creation mode. If the printer is not in profile creation mode, normal print processing is performed on the print data received by the printer in S403. If the printer is in profile creation mode (i.e., if a user has created the settings from S301 to S303 in FIG. 3), it becomes necessary to determine whether the received print data is print data necessary to create a profile or normal print data. In S404, it is determined from information attached to the print data whether the received print data has been transmitted from the profile creation software or has been transmitted from an ordinary PC on the network via a printer driver. If the received print data is from the profile creation software and if the printer is in profile creation mode, the print data is used as-is for media-profile creation and print processing is performed in S405. On the other hand, in the present exemplary embodiment, if the received print data is not from the profile creation software in spite of the fact that the printer is in profile creation mode, the print data is assumed to be normal print data and the user who transmitted that print data to the printer (or the PC as a transmission source) is notified in S406 that a normal print operation is impossible due to the fact that the printer is in profile creation mode. Thereafter, the status control unit 803 serving as a prohibition unit cancels the normal print data in S407.

As described above, the second embodiment of the present invention has a normal-print prevention function of preventing other users from performing normal printing on a printer in which a user is creating a profile, thus preventing the waste of time, resources, and media.

Variations in Second Embodiment

In the operations described in FIG. 4, if the printer is in profile creation mode, every print piece of data not transmitted from the profile creation software is cancelled; however, if a printer includes any units for storing print data, it is possible to perform normal printing on the stored print data after the printer is released from the profile creation mode. The flow chart illustrated in FIG. 5 somewhat overlaps with the flow chart described in FIG. 4, so overlapping descriptions will be omitted herein.

If the profile creation printer 203 has received print data in S401, processing is performed using the procedure described in FIG. 4. Here, a great difference in the procedure between FIG. 4 and FIG. 5 is the processing to be performed at the time of receiving print data not from the profile creation software when the printer is in profile creation mode.

In the processing method in FIG. 5, a user who transmitted the received normal print data (or a PC as a transmission source) is notified in S406 that a normal print operation is impossible due to the fact that the printer is in profile creation mode. At the same time, the received print data is stored in an internal or external memory unit of the printer in S501. The print data stored in the memory unit is not allowed to be printed by the printer until it is determined in S502 that the printer has been released from profile creation mode. During the periods before release from the profile creation mode, a user may cancel his or her transmitted print data at any time in S505. If an instruction to cancel print processing of the stored print data has been issued, the print data stored in the memory unit is cancelled in S506. If it is determined in S502 that the printer has been released from profile creation mode, a user is notified that printing is possible in S503. After that, in S504, it becomes possible to print the print data stored in the memory unit, so that the status control unit 803 causes the stored print data to be printed.

As described above, the second embodiment of the present invention has a normal-print prevention function of preventing other users from performing normal printing on a printer in which a user is creating a profile, thus preventing the waste of time, resources, and media. Moreover, even if normal print data is transmitted suddenly from other users during the course of profile creation, it is possible to hold print data without the profile creation operation being affected.

Third Embodiment

Now, another exemplary embodiment according to the present invention will be described in detail with reference to the drawings.

Figure 6:
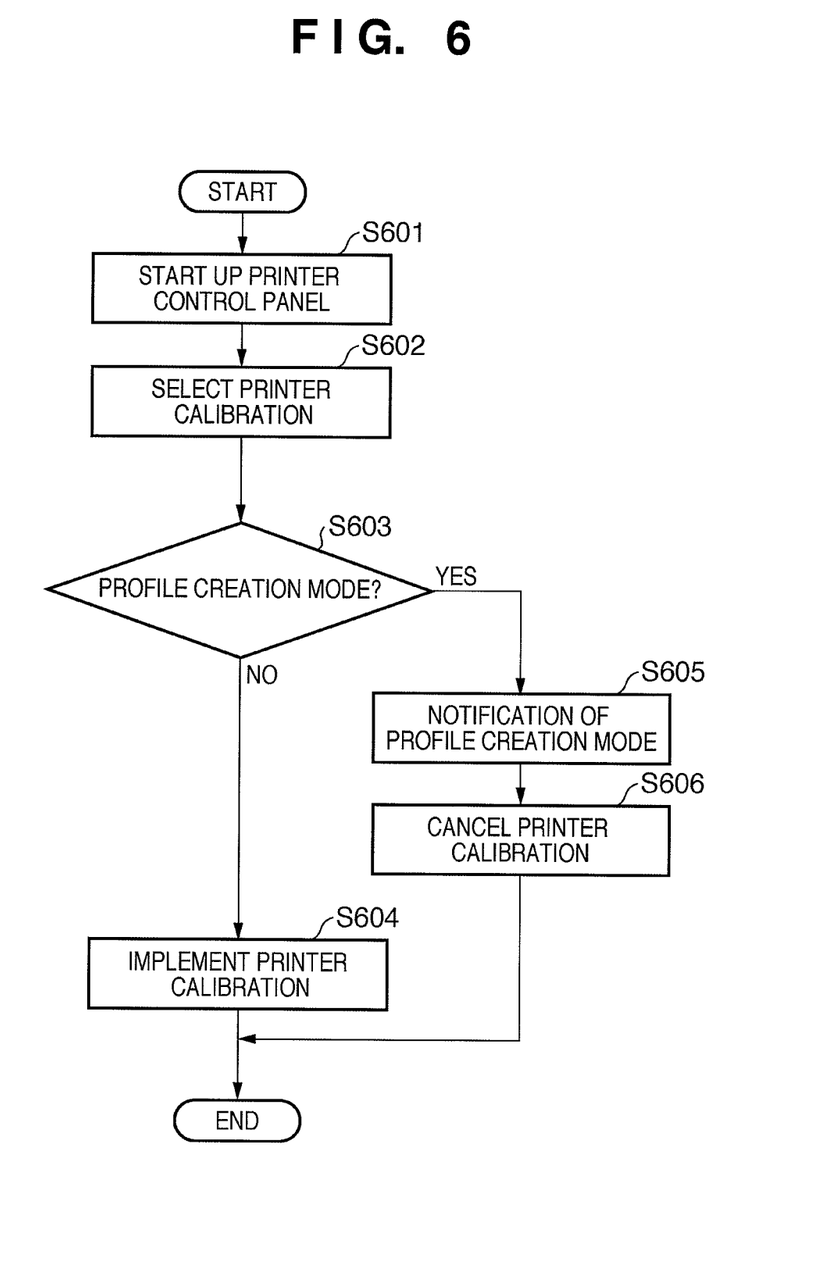
FIG. 6 is a flow chart for the implementation of printer calibration according to a third embodiment.

FIG. 6 is a flow chart explaining the third embodiment of the present invention, illustrating the implementation of printer calibration. This procedure is performed by the printer 103. Referring to FIG. 6, a user starts up a printer control panel so as to create operational printer settings in S601 (control-panel startup step). In S602, printer calibration is selected via the printer control panel (printer-calibration selection step). In S603, it is determined whether or not the printer has been set to the profile creation mode (profile-creation-mode determination step). If the printer is not in profile creation mode, printer calibration is implemented in S604 (printer-calibration implementation step). In S605, the user who attempted to implement printer calibration is notified that the printer is in profile creation mode (profile-creation-mode notification step). In S606, printer calibration processing is cancelled (printer-calibration cancelling step).

Figure 7:
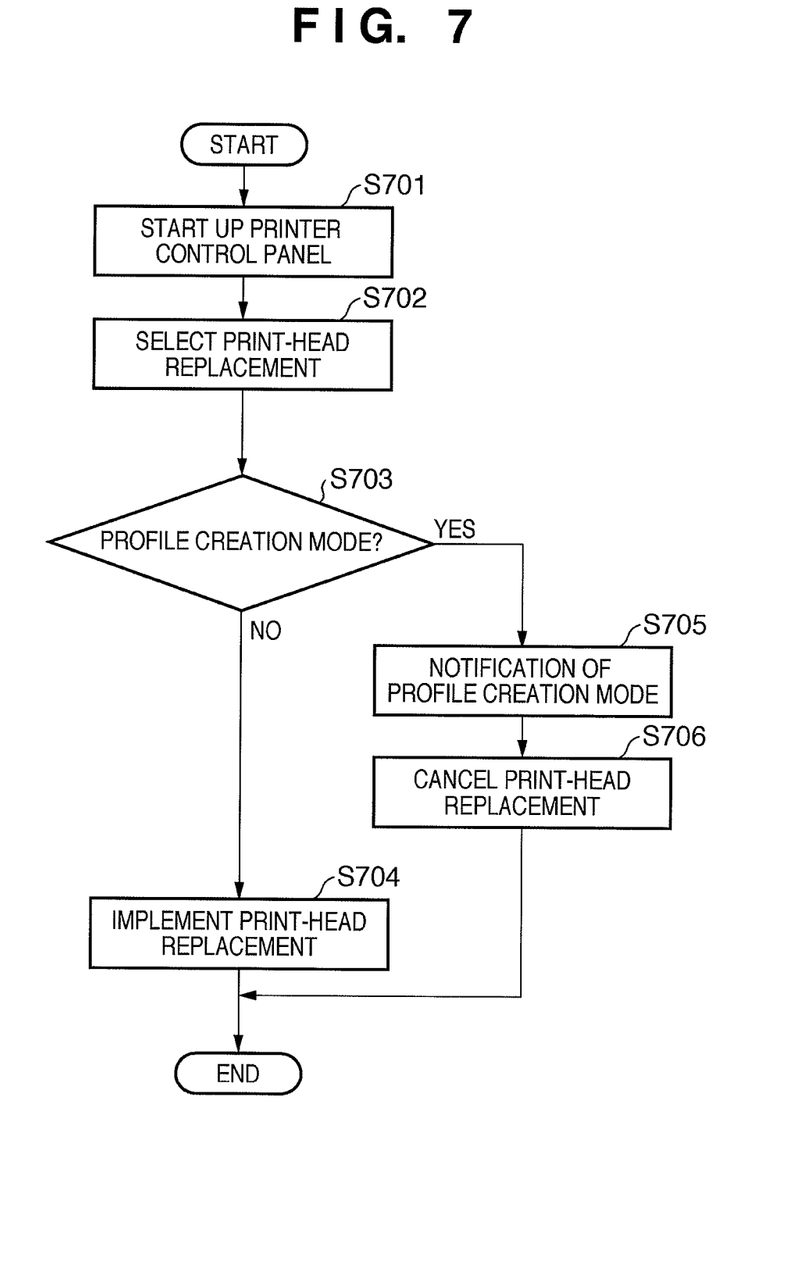
FIG. 7 is a flow chart for the implementation of print-head replacement according to the third embodiment.

FIG. 7 is a flow chart explaining the third embodiment of the present invention, illustrating the implementation of print-head replacement. This procedure is performed by the printer 103.

Referring to FIG. 7, a user starts up a printer control panel so as to create operational printer settings in S701 (control-panel startup step). In S702, print-head replacement is selected via the printer control panel (print-head-replacement selection step). In S703, it is determined whether or not the printer has been set to the profile creation mode (profile-creation-mode determination step). If the printer is not in profile creation mode, print-head replacement is implemented in S704 (print-head-replacement implementation step). In S705, the user who attempted to implement print-head replacement is notified that the printer is in profile creation mode (profile-creation-mode notification step). In S706, print-head replacement is cancelled (print-head-replacement cancelling step).

Next, the third embodiment of the present invention will be described, illustrating the contents of concrete processing. The printer and the print control system according to the third embodiment of the present invention and their operations will be described below with reference to FIGS. 6 and 7. The third embodiment relates to a change-of-status prevention function of preventing a considerable change in the status of a printer during the course of profile creation. During the media-profile creation operation, as exemplified in the present third embodiment, there is a possibility that unexpected implementation of printer calibration or print-head replacement may affect the integrity of color measurement data prior to and subsequent to such implementation. In such a case, media-profile creation may end in failure.

First, the case of implementing printer calibration is described. For the implementation of printer calibration, a user other than the user who is creating a profile starts up a printer control panel in S601. In S602, the implementation of printer calibration is selected via the started control panel. Prior to the implementation of printer calibration, it is determined in S603 whether or not the printer has been set to the profile creation mode. If the printer is not in profile creation mode, printer calibration is implemented and the process is ended in S604. If it has been determined in S603 that the printer is in profile creation mode, the user who attempted to implement printer calibration is notified in S605 that printer calibration is impossible due to the fact that the printer has been set by another user to the profile creation mode. Then, the user instruction to implement printer calibration is cancelled in S606. Through the above steps, it is possible to prevent other users from implementing printer calibration on a printer in which one user is creating a profile.

Next, the case of print-head replacement is described. A user starts up a printer control panel in S701. In S702, the implementation of print-head replacement is selected via the started control panel. Prior to the implementation of print-head replacement, it is determined in S703 whether or not the printer has been set to the profile creation mode. If the printer is not in profile creation mode, the user implements print-head replacement and the process is ended in S704. If it has been determined in S703 that the printer is in profile creation mode, the user who attempted to implement print-head replacement is notified in S705 that print-head replacement is impossible due to the fact that the printer has been set by other users to the profile creation mode. Thereafter, the user instruction to implement print-head replacement is cancelled in S706. Through the above steps, it is possible to prevent other users from implementing print-head replacement on a printer in which one user is creating a profile.

In the above-described third embodiment, users give instructions to implement printer calibration or print-head replacement via a printer control panel; however, the present invention is not limited thereto and any other units may be used to issue instructions to a printer.

Although the implementation of printer calibration and print-head replacement have been described by way of examples of the cases where the status of a printer may change, the present invention is not limited thereto; it is obvious that the present invention is effective in any other process that can cause a change in the printing status of a printer.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-326586, filed Dec. 22, 2008, which is hereby incorporated by reference herein in its entirety.

What is claimed is:

1. A printer including a print unit comprising:
a receiving unit that receives, from an external apparatus, image data that is to be printed by the print unit on a print media set to the printer;
a setting unit that sets a profile creation mode for creating profile data that is used for color conversion processing performed on image data that is to be printed by the print unit on the print media set to the printer, wherein, in the profile creation mode, the print unit prints a test image that is used for creating the profile data on the print media set to the printer, the printed test image is measured and then a measured result is transmitted to outside of the printer; and
a restriction unit that restricts (a) a replacement of the print media set to the printer with another print media and/or (b) a printing process of the printer except for a process for creating the profile data while printing the test image by the print unit, measuring the printed test image, and then transmitting a measured result to outside of the printer, if the profile creation mode is set by the setting unit,
wherein the test image data is generated by the profile creation software, and
wherein the restriction unit restricts, if the profile creation mode is set by the setting unit, a printing process of image data which is not image data that has been transmitted from the profile creation software.

2. The printer according to claim 1, wherein the profile creation software is stored in an information processor connected to the printer.

3. The printer according to claim 1, wherein the restriction unit cancels, if the profile creation mode is set by the setting unit, a printing process of the image data which is not image data that has been transmitted from the profile creation software.

4. The printer according to claim 1, further comprising:
a storage unit that stores the image data received while the profile creation mode is set by the setting unit,
wherein, if the printer has been released from the profile creation mode, the restriction unit causes the print unit to print the image data stored in the storage unit.

5. The printer according to claim 1, wherein the restrict unit notifies, if the image data is not image data that has been transmitted from the profile creation software, that the printer is in profile creation mode to a user who transmitted the image data.

6. The printer according to claim 1, further comprising an accepting unit that accepts a user's instruction of setting the profile creation mode.

7. The printer according to claim 1, wherein the replacement of the print media set to the printer with another print media is restricted by notifying that the printer is in the profile creation mode.

8. The printer according to claim 1, wherein the replacement of the print media set to the printer with another print media is restricted by not accepting a print-media replacement operation.

9. The printer according to claim 1, wherein the replacement of the print media set to the printer with another print media is restricted by mechanically locking a storage unit in which a print medium has been placed.

10. The printer according to claim 1, wherein the restriction unit restricts printer calibration while the profile creation mode is set by the setting unit.

11. The printer according to claim 1, wherein the restriction unit restricts print-head replacement while the profile creation mode is set by the setting unit.

12. A method for controlling a printer that includes a print unit, comprising:
receiving, from an external apparatus, image data that is to be printed by the print unit on a print media set to the printer;
setting a profile creation mode for creating profile data that is used for color conversion processing performed on image data to be printed by the print unit on the print media set to the printer, wherein, in the profile creation mode, the print unit prints a test image that is used for creating the profile data on the print media set to the printer, the printed test image is measured and then a measured result is transmitted to outside of the printer; and
restricting (a) a replacement of the print media set to the printer with another print media and/or (b) a printing process of the printer except for a process for creating the profile data while printing the test image by the print unit, measuring the printed test image, and then transmitting a measured result to outside of the printer, if the profile creation mode is set,
wherein the test image data is generated by the profile creation software, and
wherein, if the profile creation mode is set, the printing process of image data, which is not image data that has been transmitted from the profile creation software, is restricted.

13. The method according to claim 12, wherein the profile creation software is stored in an information processor connected to the printer.

14. The method according to claim 12, wherein, if the profile creation mode is set, printing of the image data, which is not image data that has been transmitted from the profile creation software, is cancelled.

15. The method according to claim 12, further comprising:
storing, in a storage unit, the image data received while the profile creation mode is set, wherein, if the printer has been released from the profile creation mode, the print unit prints the image data stored in the storage unit.

16. A non-transitory computer-readable storage medium storing a computer-executable program for executing the method of the claim 12.

17. A system comprising:
a first generation unit that generates a test image data;
a first receiving unit that receives, from an external apparatus, image data that is to be printed by a print unit on a print media set to the printer, wherein the first receiving unit receives the test image data generated by the first generation unit;
a setting unit that sets a profile creation mode for creating profile data that is used for color conversion processing performed on image data that is to be printed by the print unit on the print media set to the printer, wherein, in the profile creation mode, the print unit prints a test image that is used for creating the profile data on the print media set to the printer, the printed test image is measured and then a measured result is transmitted to outside of the printer;
a restriction unit that restricts (a) a replacement of the print media set to the printer with another print media and/or (b) a printing process of the printer except for a process for creating the profile data while printing the test image by the print unit, measuring the printed test image, and then transmitting a measured result to outside of the printer, if the profile creation mode is set by the setting unit;
a measurement unit that performs color measurement for image data printed by the printing unit;
a second receiving unit that receives color measurement data of the image data measured by the measurement unit; and
a second generation unit that generates a profile based on the color measurement data received by the second receiving unit.

18. A printer including a print unit comprising:
a receiving unit that receives, from an external apparatus, image data that is to be printed by the print unit on a print media set to the printer;
a setting unit that sets a profile creation mode for creating profile data that is used for color conversion processing performed on image data that is to be printed by the print unit on the print media set to the printer, wherein, in the profile creation mode, the print unit prints a test image that is used for creating the profile data on the print media set to the printer, the printed test image is measured and then a measured result is transmitted to outside of the printer; and
a restriction unit that restricts (a) a replacement of the print media set to the printer with another print media and/or (b) a printing process of the printer except for a process for creating the profile data while printing the test image by the print unit, measuring the printed test image, and then transmitting a measured result to outside of the printer, if the profile creation mode is set by the setting unit,
wherein the restriction unit restricts printer calibration or print-head replacement while the profile creation mode is set by the setting unit.

* * * * *